Figure 1:
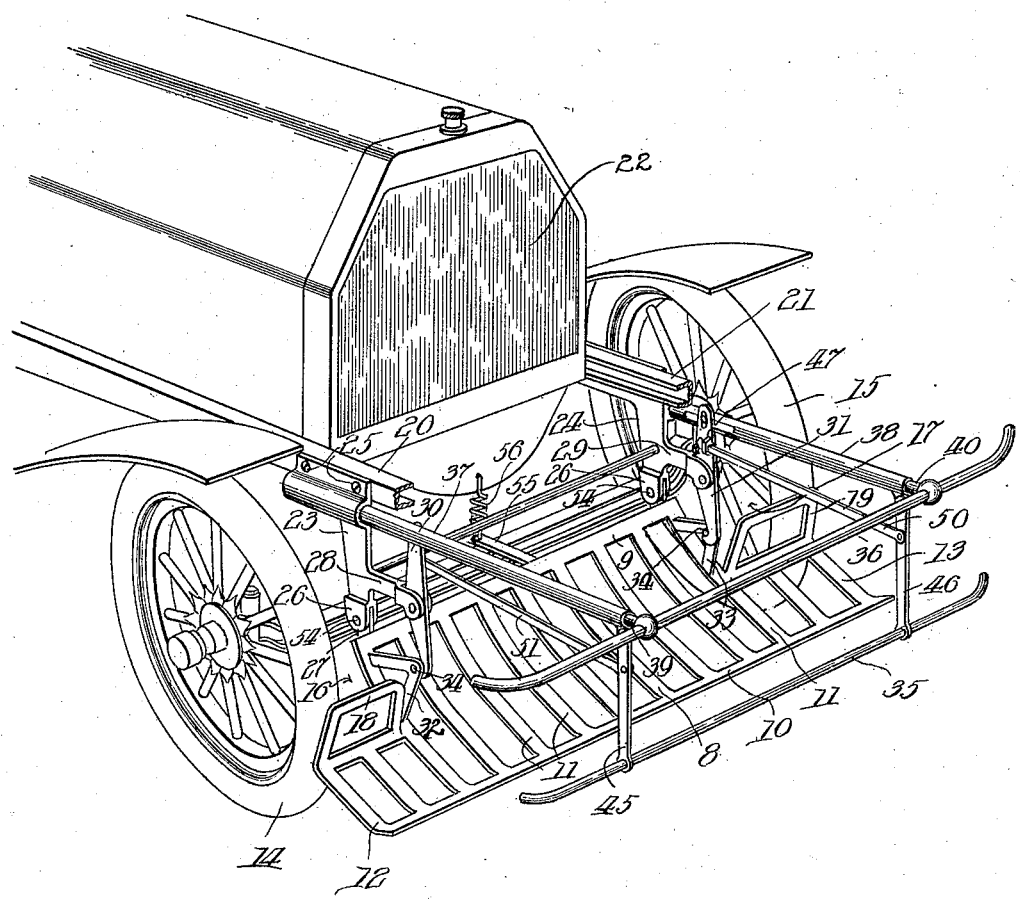

I. KSIAZEK.
SAFETY FENDER FOR AUTOMOBILES.
APPLICATION FILED JULY 11, 1910.

986,832.

Patented Mar. 14, 1911.

2 SHEETS—SHEET 1.

Witnesses:
Harry S. Gaither

Inventor:
Ignacy Ksiazek
Banning & Banning
attys

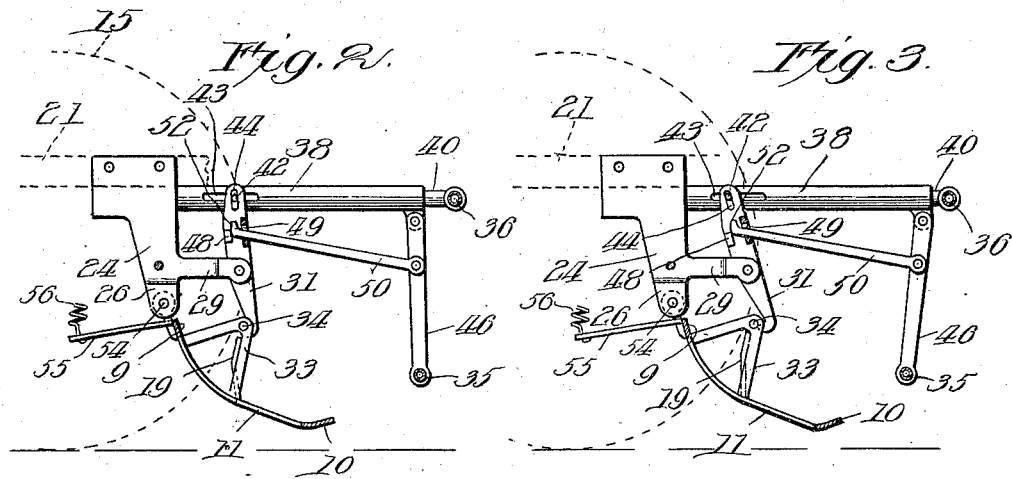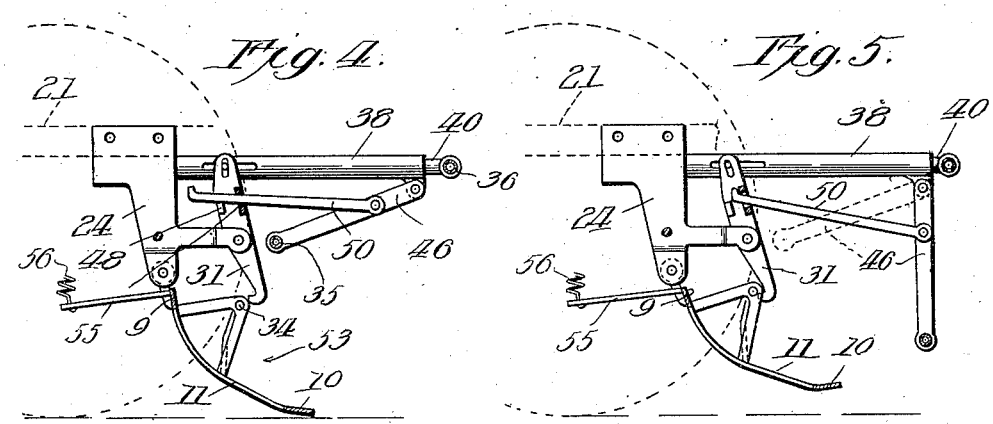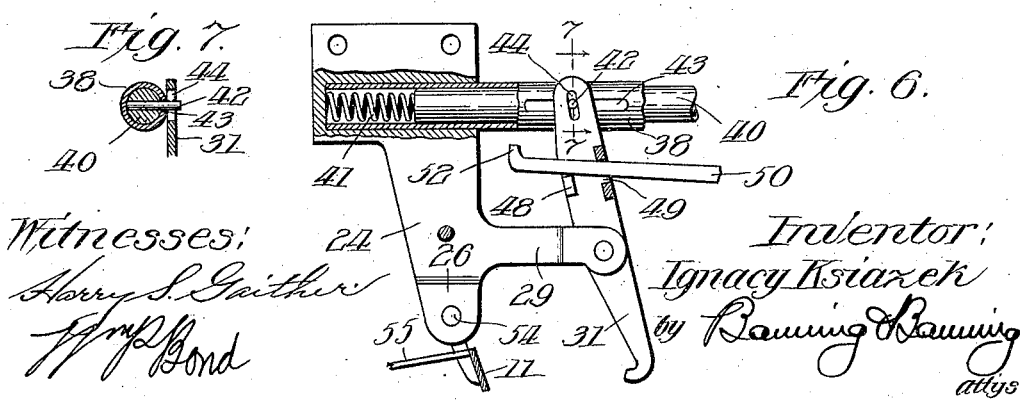

UNITED STATES PATENT OFFICE.

IGNACY KSIAZEK, OF CHICAGO, ILLINOIS.

SAFETY-FENDER FOR AUTOMOBILES.

986,832.  Specification of Letters Patent.  Patented Mar. 14, 1911.

Application filed July 11, 1910. Serial No. 571,371.

*To all whom it may concern:*

Be it known that I, IGNACY KSIAZEK, a citizen of the United States, residing at Chicago, in the county of Cook and State of Illinois, have invented certain new and useful Improvements in Safety - Fenders for Automobiles, of which the following is a specification.

In the rapid advance of the automobile industry, little or no attention has heretofore been paid to the provision of a safety device for saving people from injury by being knocked down or run over by automobiles. This has been largely due to the rapidity of development of this art, and also the obstacles which must be overcome to provide a satisfactory device for this purpose. At the present time, however, attention is being directed, largely by popular sentiment, to the necessity of providing a satisfactory device of this class.

In order for an automobile fender to be in every way satisfactory, it should conform to a number of requirements. It should be entirely automatic in its action, so that, upon striking an object with even a small force, the fender will be tripped into operative position, and so that the automobile cannot pass over the object. In the second place, the fender should be arranged to operate either when striking a high or a low object, so that it will not only pick up a person who might be lying on the pavement, but also so that it will operate if the person struck is standing up. In the next place, the parts should be so suspended as to insure instantaneous operation, because when operating at high speed a considerable distance is passed over in a short time. In the next place, the parts should be so suspended as to give a clear opening onto the fender to insure that the object will be properly lodged on the fender so as to be damaged the least amount. The fender should also be one which, in normal operation, will ride a sufficient distance above the pavement, so that in such operation, stones or other debris on the pavement will not injure the fender or interfere with its operation. But the fender should be so arranged that for country operation or where passing over unusually large obstacles it may be removed to present a large clearance above the pavement. The fender should also be of a design such as to thoroughly protect the person from injury by the front wheels. That is, it should extend out in front of these wheels far enough to prevent an object from getting under them, but at the same time it should be of a design such as not to interfere in any way with the sidewise movement of the wheels for steering purposes. The fender should also serve the purposes of buffers such as are now used on automobiles, thus accomplishing a double purpose. At the same time the fender should be of such simple construction that it may be cheaply made, and so that it will not be easily deranged in service.

The object of this invention is to provide a fender of a construction to fulfil all of the above enumerated requirements, while at the same time it is applicable to the forward portion of any of the well known types of automobiles now on the market.

Further objects and purposes will appear from a detailed description of the invention, which consists in the features of construction and combination of parts hereinafter described and claimed.

In the drawings, Figure 1 shows a perspective view of the forward portion of an automobile, including a portion of the engine housing and the front wheels, and having attached to the framework one form of fender; Fig. 2 is a detail section of the device, the guard being in its raised or normal position; Fig. 3 is a detail similar to Fig. 2, the mechanism being almost tripped by the lower rod; Fig. 4 is a detail similar to Fig. 3, the tripping operation being completed and the lower rod being swung back to provide a large clearance between it and the guard; Fig. 5, is a detail similar to Fig. 2, the guard being almost tripped by the upper rod, and the figure shows in dotted lines the manner in which the lower rod may swing back above the guard out of the way when the upper rod has completed the tripping operation; Fig. 6 shows an enlarged detail of the tripping parts and a manner in which the links of the lower tripping rod lock when said rod is thrown back in a manner to prevent it from falling; and Fig. 7 shows a detail cross section of one of the guide tubes, showing how the upper rod or buffer and associated parts are connected to one of the tripping fingers.

In the embodiment of my invention, I provide a guard of suitable construction, and hinge the same to the framework of the forward portion of the automobile, so that in normal running it will not interfere with the operation of the machine, but that when dropped by running into an object it will lie close to the pavement in a manner to insure that the object shall be picked up. I further provide mechanisms for normally holding the guard up a slight distance above the pavement, and other mechanisms for properly tripping it at the right time. The sustaining mechanisms are preferably in the form of one or more hooks or catches which will catch the guard and hold it elevated when it is once thrown up, and the tripping machanisms are preferably in the form of rods extending across the forward portion of the device, so that when struck and deflected with respect to the framework they will release the catches, allowing the guard to fall.

Referring, now, to the drawings, a guard 8 is preferably in the form of upper and lower cross bars 9 and 10, respectively, connected by a series of longitudinal bars or gratings 11. The guard should be of such a form that its end portions 12 and 13 may extend out sidewise in front of the forward wheels 14 and 15, respectively, so as to prevent objects from getting under the latter, but at the same time providing spaces 16 and 17 in which the wheels may be oscillated back and forth for steering purposes. These end portions are likewise preferably provided with upturned guards 18 and 19, so as to further protect objects from injury by the wheels. It will be understood that if a man were to be picked up on the guard in such a way that his arm would be thrown between one of the portions 18 or 19 and the corresponding wheel, he might be severely injured, because the wheel would tend to draw his arm down between these parts; therefore, the extensions 18 and 19 should be of the best form to effectually guard against such accidents.

The forward rails of the automobile frame are shown at 20 and 21, respectively. These are usually in the form of a steel channel, which may project out beyond the radiator 22, as shown. The guard is preferably supported from these extending rails, and this may be done by using castings similar to those shown at 23 and 24, which may be bolted to the rail as at 25, and provided at their lower ends with bifurcations 26. Ears 27 on the upper portion of the guard may then be pivoted between these bifurcations, either by the use of a bolt or rod. The castings 23 and 24 are provided with forwardly projecting arms 28 and 29, respectively, to which may be pivoted hooks 30 and 31. The guard is then provided at its ends with extensions 32 and 33, each carrying a pin 34, which may be caught and held by the fingers of the hooks 30 and 31. These parts are all so proportioned that when the guard is raised by rotating it about the pivots at 26 it may be held in elevated position by the engagement of the fingers of the hooks 30 and 31 with the pins 34. Evidently, then, by tripping these hooks by pressing backward on their upper ends, the fingers will be disengaged from the pins and the guard will be dropped until it strikes the pavement or some other obstacle. The means used for tripping these hooks comprise a lower fender rod 35 and an upper fender rod or buffer 36, acting in conjunction with suitable mechanisms. Two hollow tubes 37 and 38 are properly attached to the framework, as by forming them into the castings 23 and 24 in such a way that they will project out from the front part of the automobile. The buffer 36 is carried by rods 39 and 40 which extend back into the tubes 37 and 38, but are normally held in projected position by means of springs 41 seated in the rear ends of the tubes. Each of the rods 39 and 40 is provided with a pin 42 which extends out through a slot 43 in the side of the tube, said pin engaging with a slot 44 in the upper end of the corresponding hook. It is now seen that pressing the buffer 36 toward the front of the machine will cause the hooks to release the guard, which will then drop to the pavement. It is furthermore seen that the springs 41 will serve in a measure to relieve the jar from the mechanism of the automobile, as well as to lessen the shock to the person or object run into, and they will restore the hooks to their normal position immediately after the buffer is relieved. A further use will be outlined presently.

The fender rod 35 is pivotally supported from the forward ends of the tubes 37 and 38, by means of a pair of links 45 and 46, in such a way that it may be swung clear back into the position shown in Fig. 4, and shown in dotted lines in Fig. 5. This fender rod should hang close enough to the pavement to insure that no object of a size which would strike the fender when in raised position may pass under the rod. Each of the hooks 30 and 31 is provided, near its forward edge, with an ear 47, and, near its rear edge, with a lug 48, approximately in line with the hole 49 of the ear. Rods 50 and 51 are pivoted to the links 45 and 46 near their upper ends, each of said rods being passed through the hole 49 of an ear of one of the hooks, and terminating in a lug 52. The rods 50 and 51 are so positioned and supported with respect to the ears 47 and the lugs 48 that when the fender rod is in its normal or dropped position the lugs 52 will be in position to engage the lugs 48 of the hooks, so that when the fender rod is rotated back a slight amount, as by striking an object, the hooks 30 and 31 will be swung over, as shown in Fig. 3, a sufficient amount to trip the guard. In case the fender rod is swung still further the hooks will be swung forward to such an extent as to allow the lugs 52 on the rods to disengage from the lugs 48 on the hooks, so that the rods may pass over the lugs 48 in the manner shown in Fig. 4, to allow the fender rod to be swung clear up the maximum amount. While tripping the guard in this manner, by means of the fender rod, the springs 41 will act at all times to restore the hooks 30 and 31 to their normal position; therefore, as soon as the rods 50 and 51 have passed over the lugs 48, in the manner shown in Fig. 4, the springs will be exerting a force on the hooks 30 and 31 which will grip the rods between the upper edges of the ears 47 and the lugs 48 in such a manner that a forward pull on the rods 50 and 51, such as would be exerted by an attempt to restore the fender rod to its normal position, will simply act to bind the parts tighter together. In other words, when the fender rod has once been swung up into the position of Fig. 4, it cannot be restored merely by pulling down upon it. However, as soon as the buffer rod is pressed in, the hooks 30 and 31 will be rotated back against the force of the springs 41 in a manner to disengage the parts, so that the fender rod will immediately fall into its normal position.

By supporting the fender rod in the manner above described, a large clearance, as at 53, will be obtained between it and the guard when it is thrown clear back into the position of Fig. 4, so that an object can slide back to the rear end of the guard. Furthermore, the parts are interlocked in such a manner that the fender rod will easily swing back into the position of Fig. 4 out of the way and will remain in such position until purposely restored.

By suspending the guard from the framework by means of the ears 27 which engage the bifurcated portions 26, the guard may be easily removed from the automobile by merely withdrawing the pins or bolts 54. In other words, when an unusually rough or difficult piece of road is encountered, the guard may be quickly removed and the fender rod 35 may be swung back out of the way, so as to provide as large a clearance as possible underneath the forward portion of the machine. At the same time the guard may be made of light material, so that one person can easily handle it. These are important features, for the reason that great prejudice would exist against a fender which limited the use of the automobile to comparatively smooth roads, such as pavements; furthermore, a man will take care to replace the guard of the fender as soon as he strikes a good piece of road, provided it may be replaced with ease and quickness.

In order to insure more positive action in dropping the guard, a lever arm 55 may be attached to it and a spring 56 provided, attached to the arm 55 and to a fixed portion of the automobile so that the tendency of the spring will always be to throw the guard into lowered position. Obviously, any similar substitute may be used which will increase the tendency of the guard to drop into working position.

I claim:

1. In a device of the class described, a guard hinged to the vehicle frame, means for sustaining it normally above the pavement, a buffer rod projecting in advance of the vehicle frame at a distance above the pavement, a fender rod hung to the vehicle frame below the buffer rod and adapted to swing back over the guard, and means adapted to disengage said sustaining means when the buffer rod is struck, and adapted to disengage the sustaining means when the fender rod is swung back, substantially as described.

2. In a device of the class described, a guard hinged to the vehicle frame, means for sustaining it normally above the pavement, and a fender rod suspended in a substantially vertical manner in advance of the body of the vehicle, and adapted, when swung back, to disengage the sustaining means, the guard being in the form of an apron, having its rear edge at a greater elevation than its forward edge, and the fender rod being suspended in a manner whereby, when it is completely swung back, it will swing over the guard in a manner to present an unobstructed space above the guard for receiving the object, substantially as described.

3. In a device of the class described, a guard in the form of an apron, having its rear edge at a greater elevation than its forward edge and hinged to the vehicle frame, means for sustaining its forward edge normally above the pavement, a fender rod suspended from the device above and in advance of the front edge of the guard, a buffer rod projecting in advance of the vehicle, the fender rod being adapted to swing back over the guard, means for disengaging the sustaining means when the fender rod is swung back, means for retaining the fender rod in rotated position after the suspending means have been disengaged, and means for releasing said retaining means when the buffer rod is struck, substantially as described.

4. In a device of the class described, a guard hinged to the vehicle frame and provided with a sustaining pin, a hook pivoted to the vehicle frame in position to normally engage said pin for retaining the guard in elevated position, a buffer rod, and means for retaining the same normally in projected position, said buffer rod being connected to the hook in a manner whereby, when the buffer rod is struck, the hook is rotated to disengage the pin, substantially as described.

5. In a device of the class described, a removable guard in the form of an apron, having its rear edge at a greater elevation than its forward edge, means for removably hinging said guard, near its rear portion, to the vehicle frame, means for sustaining its forward portion normally above the pavement, and a fender rod suspended from the device in advance of the vehicle, and adapted, when swung back, to release said sustaining means, and adapted, when swung back and when the guard is removed, to present a clear and unobstructed space beneath the device, substantially as described.

IGNACY KSIAZEK.

Witnesses:
JAN DUSBERGER,
ROMAN R. TOARENER.

Copies of this patent may be obtained for five cents each, by addressing the "Commissioner of Patents, Washington, D. C."